A. SCHWARCMAN.
PROCESS OF HYDROGENATION.
APPLICATION FILED AUG. 20, 1917.
1,280,315.
Patented Oct. 1, 1918.
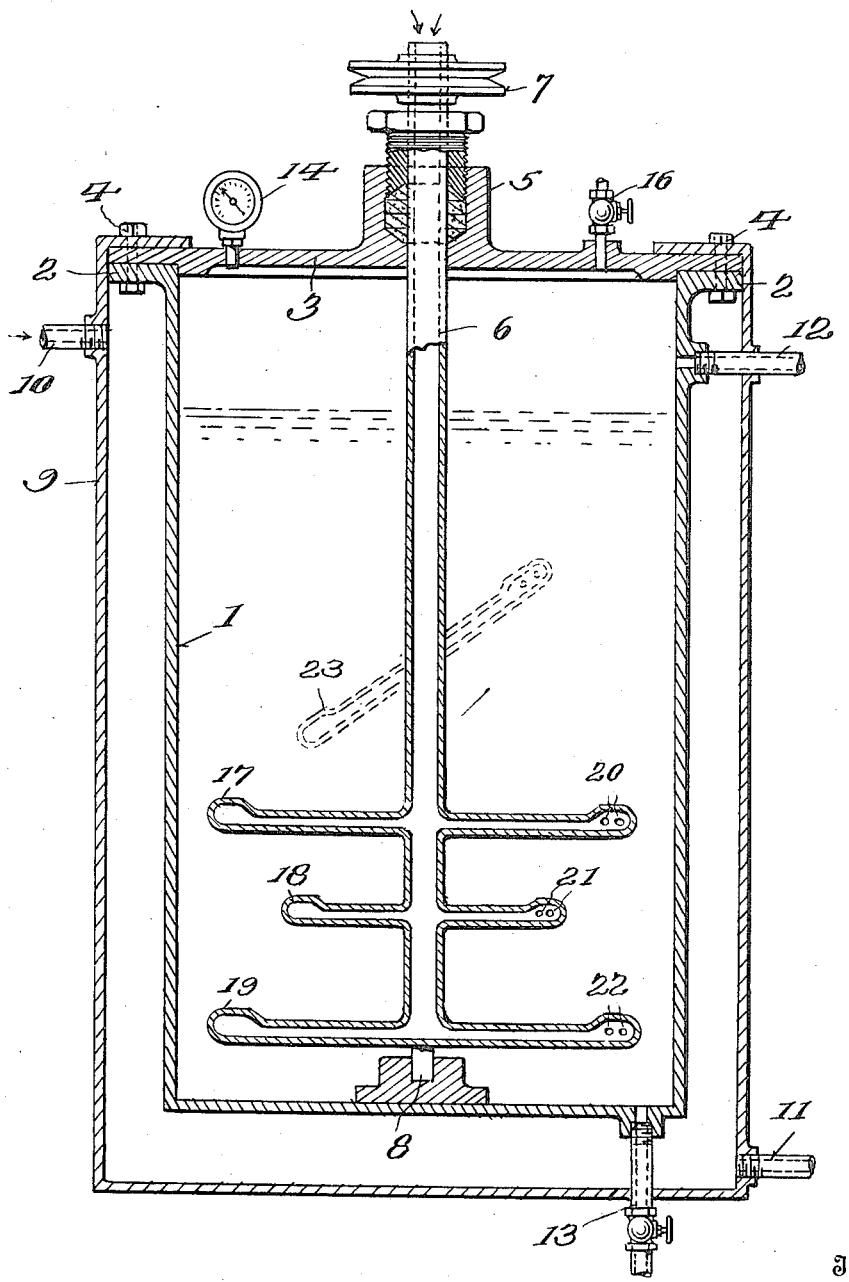
Witness
Inventor
Alexander Schwarcman
By K. P. McElroy
his Attorney

UNITED STATES PATENT OFFICE.

ALEXANDER SCHWARCMAN, OF BUFFALO, NEW YORK, ASSIGNOR TO KELLOGG PRODUCTS, INC., OF BUFFALO, NEW YORK, A CORPORATION OF NEW YORK.

PROCESS OF HYDROGENATION.

1,280,315.              Specification of Letters Patent.         Patented Oct. 1, 1918.

Application filed August 20, 1917. Serial No. 187,126.

*To all whom it may concern:*

Be it known that I, ALEXANDER SCHWARCMAN, a citizen of the United States, residing at Buffalo, in the county of Erie and State of New York, have invented certain new and useful Improvements in Processes of Hydrogenation, of which the following is a specification.

This invention relates to processes of hydrogenation; and it comprises a method of hydrogenation of oils and other liquid organic bodies by the aid of a catalyst, such as nickel, palladium, etc., used alone or on a carrier, but advantageously on a carrier—such carrier being advantageously a specially treated fullers' earth—wherein the hydrogen is introduced into the mass of oil and catalyst by a very rapidly rotating tubular device carrying a set or sets of perforated arms of alternating greater and less length, the rapidity of rotation of such device being sufficient to produce the phenomenon known as cavitation; all as more fully set forth and as claimed.

The hydrogenation of oils with the aid of catalysts for the purpose of hardening the oil (converting it into fatty products of higher melting point) is now an old and well established industry; the hardening being carried far enough to produce a complete hardening or any partial degree of hardening that may be desired. As is well understood, in such operation oleic acid or olein takes up hydrogen and is converted into stearic acid or stearin as the case may be. Other liquid fatty acids and their glycerids are similarly affected; linolein for instance being converted into a solid fat in the same way as olein. The exact nature of the actions occurring however is not known; it is merely known that in some way the hydrogen is taken up by the catalyst (nickel or palladium) and redelivered to the oil to effect the chemical action stated. In this operation, which is ordinarily carried on at a rather high temperature, securing an efficient contact between the hydrogen and the oil containing the catalyst is of course absolutely necessary; and very many ways of securing such a contact have been disclosed and are in use. The solubility of hydrogen in oils being quite little, and the hydrogen occupying an enormous bulk in comparison to its weight, the necessity for this efficient contact is obvious. A strong current of hydrogen blown through the mixture of oil and catalyst will effect the hardening; but the action is slow. By filming out the mixture of oil and catalyst in the atmosphere of hydrogen more extensive surfaces are presented and solution of the gas in the liquid is to that extent quickened; but the action is still slow. Many ways of filming out in this manner have been proposed, such as the use of a rotating wire gauze stirrer, spraying the oil and catalyst into the hydrogen, causing the oil to contact with the gas as a fountain or a rain, etc. But in all cases the area of contact was less than could be desired.

I have found that I can secure a much more efficient contact by a particular method of reducing the hydrogen to the very finest possible bubbles and maintaining these bubbles beneath the surface of the liquid mixture of oil and catalyst. Hydrogen is of course a very light gas and it tends to rise through a liquid at a greater speed than other gases so that in using a strong current of hydrogen it is more difficult to secure good contact than in the case of such other gases—the bubbles rise quicker. The rise of a bubble through a liquid however is not wholly a question of the specific gravity. Viscosity and friction play their part. Obviously, the smaller are the bubbles not only the greater is the area of contact between liquid and gas but for a given total volume of gas the slower the tendency of the bubbles to rise. And by carrying the subdivision of the hydrogen bubbles to the extreme, not only is the contact area enormously increased but it is possible to retain this contact for a relatively long time; the bubbles have but little tendency to rise.

On rotating any arm-carrying device in a liquid, the liquid of course closes in behind the arm as it progresses but after a certain velocity is attained (different with different liquids), the flow of liquid is not quite as fast as the speed of the arm and a vacuum forms close behind the moving arm. This phenomenon is known as "cavitation." Now if the device be tubular with rearward perforations or with apertures at the ends of the arm and be supplied with hydrogen, the gas of course prevents the formation of vacua and rushes in. With a proper structure and rate of rotation, this incoming hydrogen enters and forms the minutest possible bubbles which are uniformly mixed with the oil by the whirling motion of the inside surfaces of the cavities formed by cavitation. The net result is the formation of a very intimate mixture of oil and gas in the form of what may be here called, for convenience, an emulsion, and this emulsion is, under the circumstances, tolerably permanent.

I find however that to secure the best results, it is advisable to use several such arms at different levels in the body of liquid, these arms being of different length or radial extension. The reason for this is that it is in practice desirable to use a body of liquid of substantial depth; and in such a body the cavitations from a single pair of arms are too local; and a better distribution of hydrogen is obtained by the use of several arms. It is the object of this invention to supply hydrogen at about the rate at which it will be used up and to keep it within the liquid or below its surface until it is so used up. The hydrogen escaping may of course be returned or led into another vessel; but this adds unnecessary complications, and with proper operation the hydrogen is efficiently utilized in a single passage. With a plurality of sets of arms at different levels and of different lengths (with, of course, different rates of speeds at the ends) this result of holding the gas within the liquid and equally and uniformly distributed throughout the same may be secured.

I find that with the described method of operation, the rate of hydrogenation is so rapid that the liquid need not be kept at any very high temperature, such as is ordinarily employed; hydrogenation taking place very rapidly at temperatures as low as 300° F. and below. The lower the temperature, the less fluid is the oil and the less the speed necessary for cavitation; and, vice versa, at equal rates of rotation the more efficient is the emulsification of the hydrogen. A temperature of about 300° is however very convenient; and the more so since it enables the use of boiler steam and ordinary jackets for heating. I therefore advantageously use a temperature in this neighborhood.

Low temperature hydrogenation of course requires an energetic catalyst, which may be made in any of the usual ways with nickel or palladium or other catalytic metal. But I find it best to use a rather special catalyst, made as described in my copending application Serial No. 185,917, filed August 13, 1917. Briefly stated, this method of making catalyst is to impregnate a fullers' earth or good decolorizing powder with nickel nitrate and then precipitate nickel oxid (or hydrate) with caustic soda or the like containing dissolved a considerable proportion of an organic nitrogenous colloid, such as wool, hair, glue, casein, etc. Wool dissolved in caustic soda is best. Under the influence of this colloid, the nickel oxid is precipitated in a more or less colloid form and in such a relation to the fullers' earth that it does not readily slime away. This relation is retained after the compound catalyst so produced is heated and the nickel reduced to metal although the wool disappears in the heating. This catalyst I find very useful in the present invention since in addition to its energetic hydrogenating and decolorizing actions, (due respectively to the nickel and the fullers' earth) it has a tendency to pick up or occlude the very minute hydrogen bubbles of the emulsion; still further holding them against rising. It is, so to speak, a weighting means for the hydrogen. The bubbles so picked up or occluded are of course in the nearest possible proximity to the nickel; and they disappear by absorption very rapidly.

The rotation of the arms delivers hydrogen into the liquid very rapidly, drawing it in from the source; but the rapidity of hydrogenation in the present invention is so great that I can supply what is in effect a strong current of hydrogen to an apparatus of limited size and produce an efficient utilization of the gas; the utilization being so complete that very little hydrogen goes beyond the liquid.

In the accompanying illustration I have shown, more or less diagrammatically, apparatus within the present invention and adapted for use in the described process. In this showing the figure is a central vertical section, certain parts being shown in elevation.

The tank 1 of iron or steel or other suitable material is flanged at 2 and is provided with a top 3 secured in place by means of the bolt and nuts 4. The top is provided with a stuffing box 5 through which passes a hollow shaft 6 driven through pulley 7 from any suitable source of power. The shaft rests on the seat 8 at the bottom of the tank. The tank is provided with a jacket 9 having inlet 10 and outlet 11 for steam or other heating medium and it is further provided with an oil inlet 12 and oil outlet 13. The top of the tank carries the pressure gage 14 communicating with the interior of the tank and also the valve controlled vent 16 for waste gases.

Commercial hydrogen is rarely quite pure and any inert gases which the hydrogen contains tend to accumulate above the body of liquid as a body or layer of gas. This gas, which is generally quite impure, may be vented from time to time and used for any purpose for which it is suited.

The hollow shaft (6) is provided with a plurality of hollow arms 17, 18 and 19 each of which is perforated at or near its extremity at 20, 21 and 22, respectively; if desired, one or more of the arms may be placed at an angle to the shaft as is shown in dotted lines at 23.

In use the tank may be nearly filled with the mixture of oil and catalyst. There being no attempt in the present process to film out or otherwise distribute the oil in an atmosphere of hydrogen, it is not necessary to provide the usual large free space for containing gas.

No attempt is made to stir the overlying gas into the liquid. As a matter of fact, the gas atmosphere above the oil after the operation has continued a little time is usually largely composed of inert gases. Commercial hydrogen is never quite pure; and the contained nitrogen or air, carbon monoxid, etc., are not absorbed in the liquid and pass upward into this gas atmosphere.

The tank being filled with oil and catalyst and shaft 6 placed in rapid rotation, hydrogen is delivered into the top of the hollow shaft at about the rate at which it can be absorbed, gage 14 being used to follow the operation. Introduction of too much gas is followed by a rise in the pressure shown by gage 14, that of too little gas by a drop in the pressure. With most grades of hydrogen however there is an accumulation of inert gases in the space above the liquid, and this in itself tends to a rise in pressure; a fact which must be borne in mind in following the operation. With a 95 per cent. hydrogen, for example, at least 5 per cent. of the gas introduced must ultimately find its way to the top. The gas, either due to the pressure at which it is introduced or to the suction caused by the cavitation is delivered through the hollow arms 17, 18 and 19 to the extremities from which it immediately passes to the cavities produced by the rapid rotation of the arms. The speed of rotation of course depends upon the viscosity of oil, the size of the arms, particularly at the ends and other conditions. I have found that with the apparatus such as is shown a minimum speed of rotation of 350 revolutions per minute is satisfactory to produce cavitation. The effect of cavitation will be increased with higher speed. During the operation the oil may be heated by introduction of steam at 10 and removal at 11.

The gas is introduced by cavitation suction, as stated, as very fine bubbles with, in the aggregate, an enormous surface and absorption is very rapid and particularly if the described catalyst be employed. The various arms make conflicting vortices, which circulate rapidly and maintain the emulsion. As absorption goes on, the bubbles of course rapidly diminish in size.

Operating in the described manner, I find that I can carry hydrogenation to any desired stage in a time much shorter than that required by any method of simply agitating the oil and catalyst in the presence of an atmosphere of hydrogen or any method of filming out the oil in such an atmosphere. As stated, it is the object of the present method to maintain the hydrogen, in a state of the utmost subdivision beneath the surface of the oil until it disappears. Any free gas space there may be above the liquid is of use mainly for collecting inert gaseous impurities in the hydrogen.

The introduction of the hydrogen may be under pressure or not as may be desired; and any desired pressure may prevail within the apparatus, either above or below atmospheric. Absorption is rapid and complete at the ordinary pressure; but an increase in pressure of course hastens the action. The use of at least some degree of pressure above atmospheric is further advantageous in following the operation by the gage indications.

The process described may be applied not only to oils but to other liquid compositions capable of hydrogenation. It is however particularly adapted to oils such as cottonseed oil, cocoanut oil, linseed oil, etc. Using the decolorizing catalyst described and working at the low temperature possible under the present invention, clear, light colored edible fats may be obtained. Cocoanut oil also yields valuable products. Peanut oil gives a good buttery product.

Cavitation in rotating an arm through a liquid ordinarily produces vacuous cavities; but in the present invention the cavities are filled with hydrogen as soon as formed and vacua do not exist.

What I claim is:—

1. The process of hydrogenating which comprises rotating a plurality of hollow perforated arms at different levels in a body of oil and catalyst while supplying hydrogen to the oil through such arms, the speed of rotation being sufficient to produce cavitation.

2. The process of hydrogenating which comprises rotating a plurality of hollow perforated arms at different levels in a body of oil and catalyst while supplying hydrogen to the oil through such arms.

3. The process of hydrogenating which comprises rotating a plurality of hollow perforated arms at different levels in a body of oil and a compound gas-occluding catalyst while supplying hydrogen to the oil through such arms, the speed of rotation being sufficient to produce cavitation.

4. The process of hydrogenating which comprises rotating a plurality of hollow perforated arms at different levels in a body of oil and a compound gas-occluding catalyst while supplying hydrogen to the oil through such arms.

5. The process of hydrogenating oil containing a catalyst which comprises rotating a stirring arm in a body of oil at a speed sufficient to produce cavitation therein and supplying hydrogen to the cavities immediately upon their production.

In testimony whereof, I affix my signature.

ALEXANDER SCHWARCMAN.